US 6,624,749 B1

United States Patent
Winterkorn

(10) Patent No.: US 6,624,749 B1
(45) Date of Patent: Sep. 23, 2003

(54) INDICATING INSTRUMENT

(75) Inventor: Horst Winterkorn, Wettenberg-Wissmar (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/579,807

(22) Filed: May 26, 2000

(30) Foreign Application Priority Data

May 28, 1999 (DE) .......................................... 199 24 429

(51) Int. Cl.7 ................................................. G09F 9/00
(52) U.S. Cl. ..................... 340/461; 340/462; 340/425.5; 345/636
(58) Field of Search ................................. 340/461, 462, 340/980, 995, 905, 425.5, 945, 815.4; 701/1, 29; 345/636, 30

(56) References Cited

U.S. PATENT DOCUMENTS

| | | | | |
|---|---|---|---|---|
| 4,737,916 A | * | 4/1988 | Ogawa et al. ............... 364/443 |
| 4,761,742 A | * | 8/1988 | Hanabusa et al. ........... 364/443 |
| 5,764,139 A | * | 6/1998 | Nojima et al. ............... 340/461 |
| 5,864,305 A | * | 1/1999 | Rosenquist .................. 340/905 |
| 5,949,331 A | * | 9/1999 | Schofield et al. ........... 340/461 |
| 6,106,121 A | * | 8/2000 | Buckley et al. ............. 359/839 |
| 6,182,010 B1 | * | 1/2001 | Berstis ........................ 701/211 |
| 6,373,472 B1 | * | 4/2002 | Palalau et al. .............. 345/173 |

FOREIGN PATENT DOCUMENTS

| | | |
|---|---|---|
| DE | 19732119 | 1/1998 |
| DE | 19732156 | 1/1998 |
| DE | 19753928 | 6/1999 |

* cited by examiner

Primary Examiner—Benjamin C. Lee
Assistant Examiner—Phung T Nguyen
(74) Attorney, Agent, or Firm—Martin A. Farber

(57) ABSTRACT

In an indicating instrument (1) intended for a motor vehicle, a plurality of display levels (2, 3, 4) partially superposed on one another permit a display at staggered depths. As a result, not only three-dimensional forms of display but also a preferred arrangement of the essential information according to the operating conditions can be provided on the first display level (2). For unproblematical exchange or later retrofitting, the display levels (2, 3, 4) fixed in a housing of the display instrument (1) a plug-in connection (11). The indicating instrument (1) can consequently be adapted to individual requirement in a simple way.

13 Claims, 1 Drawing Sheet

INDICATING INSTRUMENT

FIELD AND BACKGROUND OF THE INVENTION

The invention concerns an indicating instrument for a motor vehicle having at least two display levels, the first display level being at least partially superposed on the second display level and it being possible for an at least partially transparent state to be set for the first display level.

Such an indicating instrument makes it possible for information to be displayed on the various display levels in a way appropriate for the user and in keeping with requirements. As a result, the information essential for the respective operating conditions can be displayed on the first display level, facing a motor vehicle occupant, and consequently in the direct field of view of the driver. At the same time, the classic pointer instruments can in this case be supplemented by indications for which other forms of display, for example digital displays, are better suited. In this case, indications of secondary significance, for example the indication of the time of day, can also be completely suppressed temporarily, for example to bring the display of a navigation system to the forefront. For this purpose, in the non-activated state the first display level is essentially transparent, so that the indications of the second display level can be read off unrestrictedly.

It is disadvantageous in the prior art described, that the large number of indications available as standard or as options require a respectively extensive, in particular structural, adaptation of the indicating instrument. The associated high expenditure in production has led to the use of such indicating instruments so far being of only secondary importance in practice.

SUMMARY OF THE INVENTION

The invention is based on the problem of providing an indicating instrument of the type stated at the beginning in such a way that the expenditure in production can be significantly reduced.

This problem is solved according to the invention by at least the first display level being exchangeably connected to the indicating instrument. As a result, the indicating instrument can be adapted without any problems to the desired information display, by exchanging the corresponding display level. This allows additional information to be provided or the existing indications to be supplemented later by exchanging the display level. Continual adaptation of the information display to the advancing state of the art is consequently likewise possible without any structural intervention.

Particularly well suited for this purpose is an advantageous development of the invention by which the exchangeable display level can be fixed on the indicating instrument by means of a plug-in connection. The manual intervention required for exchanging the display level can consequently be carried out effortlessly and without special tools in a simple way. Consequently, it is also possible to provide, for example, merely temporary use of special display levels, for example as an option for car rental or a vehicle fleet. They consequently only have to be stocked in small numbers.

Also particularly favorable is a development of the invention in which the fixing of the display level in the indicating instrument at the same time also establishes electrical contact of the display level. As a result, incorrect connection of the exchangeable display level can be prevented, allowing the exchange also to be carried out outside a specialist workshop. At the same time, the fixing of the display level may in this case take place in the region of the front side of the indicating instrument, so that the fitting expenditure can be further reduced.

Also particularly advisable here is a development of the invention in which the indicating instrument is designed for automatic detection of the display level respectively used. Therefore, the adaptation of the activation possibly required by the exchange of the display level takes place without manual intervention. For this purpose, a calibration of the existing display levels and subsequent software implementation is carried out, in particular each time the motor vehicle is put into operation. If need be, software updating may also be carried out by an info server.

The display levels can be operated essentially independently of one another. Particularly useful, on the other hand, is an embodiment of the invention in which the activation of the display levels takes place in dependence on one another. As a result, the information display on the various display levels can be matched with one another in such a way that the interaction, the readability or the logical assignment can be improved or simplified. For example, digital displays can be provided with a symbol or a flow diagram of the corresponding function behind them or else three-dimensional effects can be achieved.

Another particularly advantageous embodiment of the invention is obtained if the indicating instrument is designed for receiving further display levels. As a result, further information, which cannot be displayed with the already existing display levels, can be provided with the aid of additional display levels. What is more, corresponding fixing on the display instrument is not evident, particularly to a viewer, and consequently makes it possible for the indicating instrument to be designed in a visually attractive manner.

A particularly favorable development of the invention is also provided here by the display level facing a motor vehicle occupant also having at the same time an operator interface intended for the motor vehicle occupant. Such an operator interface, designed for example as a selection switch, enables the motor vehicle occupant to make an individual selection of the information display desired. Such an operator interface may also be used for example for operating a satellite navigation system (GPS) brought up on the display level or for further functions independent of the display level or the indicating instrument.

Another advantageous embodiment of the invention is obtained if the indicating instrument has an exchangeable control unit. As a result, information which cannot be activated with the control unit at the factory can also be displayed. At the same time, the computing power of the control unit can be adapted to the rapidly advancing development by exchanging the processor unit.

Another embodiment of the invention that is particularly well suited for practical use is obtained by the indicating instrument having an exchangeable housing. Consequently, the indicating instrument can be used in different motor vehicles, to achieve a broad standardization of components. In addition to the changed visual appearance, the housing in this case also permits simple connection to a front dashboard of different motor vehicles.

In addition to the information display, it is also possible for the rear display level to be darkened or dimmed by means of the superposed display level, in order to improve the readability of the latter in variable ambient brightness.

The invention allows various embodiments. For further illustration of their basic principle, one of these is described below and represented in the drawing, in which:

DETAILED DESCRIPTION OF THE PREFERRED EMBODIMENT

Figure 1:
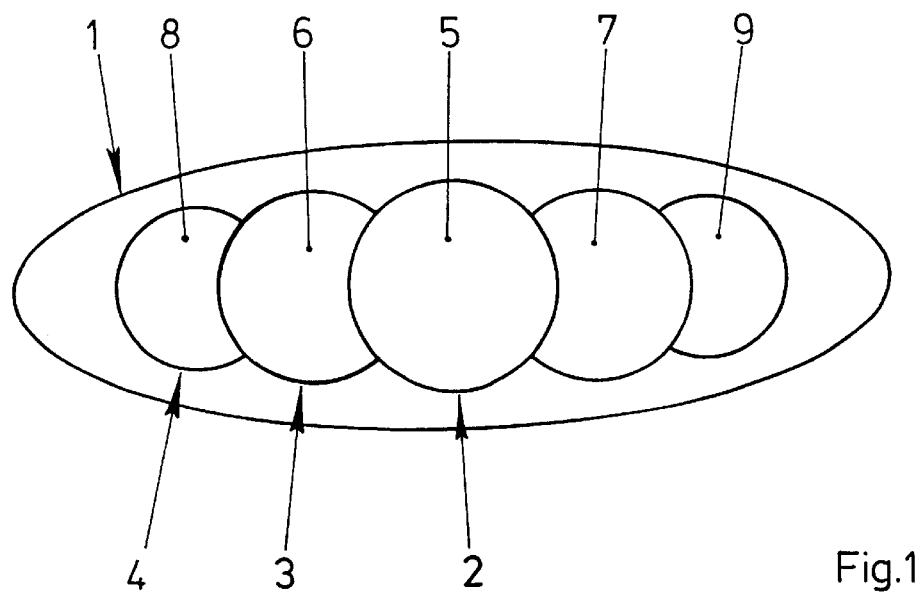
FIG. 1 shows a front view of an indicating instrument according to the invention.

FIG. 1 shows a basic diagram of a display instrument 1 in a front view. A plurality of display levels 2, 3, 4, partially superposed on one another, can be seen, a first indication 5 being assigned to the first display level 2, two indications 6, 7 being assigned to the second display level 3 and two further indications 8, 9 being assigned to the third display level 4. The desired display level 2, 3, 4 is in principle freely selectable and is based, for example, on the current operating conditions. For example, warning messages may appear on the first display level 2, facing a viewer (not represented), to attract the immediate attention of the driver.

Figure 2:
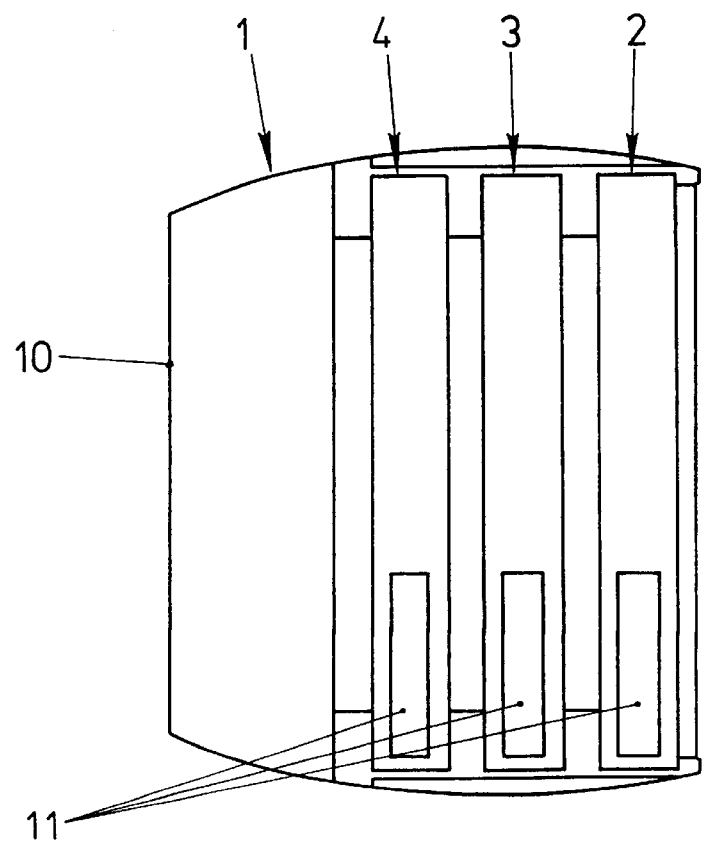
FIG. 2 shows a partly sectioned side view of the indicating instrument shown in FIG. 1.

The arrangement of individual display levels 2, 3, 4 is further illustrated by FIG. 2. This shows the indicating instrument 1 with a housing 10 in a partly sectioned side view. The individual display levels 2, 3, 4 are in this case respectively arranged in the housing 10 by means of a fixing designed as a plug-in connection 11 in such a way that electrical contact of the respective display level 2, 3, 4 is established at the same time as the fixing. An exchange of the display level 2, 3, 4 possibly to be carried out can in this case be performed unproblematically, without additional adaptation of a control unit (not represented). For this purpose, the control unit initially carries out an identification of the respective display level 2, 3, 4 and subsequently an adaptation of the control program. Current control programs and screen drivers may in this case be called up from a data server. The activation takes place in particular by a non-actuated portion of the respective display level 2, 3, 4 being made essentially transparent and the display levels 2, 3, 4 arranged behind it being readable.

I claim:

1. An indicating instrument for a motor vehicle having at least two display levels, the first display level being at least partially superposed on the second display level and wherein an at least partially transparent state is settable for the first display level, wherein at least the first display level (2) is exchangeably connected to the indicating instrument (1).

2. The indicating instrument as claimed in claim 1, wherein the exchangeable display level (2, 3, 4) is fixable on the indicating instrument (1) by means of a plug-in connection (11).

3. The indicating instrument as claimed in claim 1, wherein the fixing of the display level (2, 3, 4) in the indicating instrument (1) at the same time also,establishes electrical contact of the display level (2, 3, 4).

4. The indicating instrument as claimed in claim 1, wherein the indicating instrument (1) is provided for automatic detection of the display level (2, 3, 4) respectively used.

5. The indicating instrument as claimed in claim 1, wherein Activation of the display levels (2, 3, 4) takes place in dependency on one another.

6. The indicating instrument as claimed in claim 1, wherein the indicating instrument (1) is provided for receiving further display levels (2, 3, 4).

7. The indicating instrument as claimed in claim 1, wherein the display level (2) facing a motor vehicle occupant also has at the same time an operator interface intended for the motor vehicle occupant.

8. The indicating instrument as claimed in claim 1, wherein the indicating instrument (1) has an exchangeable control unit.

9. The indicating instrument as claimed in claim 1, wherein the indicating instrument (l) has an exchangeable housing (10).

10. The indicating instrument as claimed in claim 2, wherein the fixing of the display level (2, 3, 4) in the indicating instrument (1) at the same time also establishes electrical contact of the display level (2, 3, 4).

11. The indicating instrument as claimed in claim 1, wherein a control unit identifies the respective displays (2, 3, 4) and adapts a control program thereto.

12. The indicating instrument as claimed in claim 1, wherein the desired display level (2, 3, 4) is freely selectable based upon the current operating conditions of the vehicle.

13. The indicating instrument as claimed in claim 1, wherein each respective display level includes at least one indication for presenting information to an operator of the vehicle.

* * * * *